(12) United States Patent
Eyrich et al.

(10) Patent No.: US 12,398,753 B2
(45) Date of Patent: Aug. 26, 2025

(54) BEARING ASSEMBLY

(71) Applicant: AKTIEBOLAGET SKF, Gothenburg (SE)

(72) Inventors: Juergen Eyrich, Burkardroth (DE); Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 91 days.

(21) Appl. No.: 17/979,220

(22) Filed: Nov. 2, 2022

(65) Prior Publication Data
US 2023/0167851 A1 Jun. 1, 2023

(30) Foreign Application Priority Data
Nov. 30, 2021 (DE) .......................... 102021213567.6

(51) Int. Cl.
*F16C 19/52* (2006.01)
*C09D 5/26* (2006.01)
*F16C 33/62* (2006.01)

(52) U.S. Cl.
CPC .............. *F16C 19/525* (2013.01); *C09D 5/26* (2013.01); *F16C 33/62* (2013.01); *F16C 2223/30* (2013.01); *F16C 2233/00* (2013.01)

(58) Field of Classification Search
CPC .... F16C 19/525; F16C 33/62; F16C 2223/30; F16C 2233/00; C09D 5/26
See application file for complete search history.

(56) References Cited

U.S. PATENT DOCUMENTS

| | | | | |
|---|---|---|---|---|
| 2001/0052725 A1* | 12/2001 | Koschinat | ........... | B60B 27/0052 301/6.3 |
| 2010/0132444 A1* | 6/2010 | Dodd | .................... | B60B 7/0013 301/105.1 |
| 2012/0032793 A1* | 2/2012 | Sonzala | .................... | B60T 5/00 152/417 |
| 2016/0273581 A1* | 9/2016 | Wallmeier | ............ | F16C 41/008 |

OTHER PUBLICATIONS

Indestructible Paint; "Colour Changing Thermochromic Paints", Brochure, pp. 1-8, Colour-Therm, Indestructible Paint Ltd, Birmingham, U.K.
Indestructible Paint; "Non-Reversible Thermal Indicating Paint"; pp. 1-3; Dated Sep. 8, 2021; Indestructible Paint Ltd, Birmingham, U.K.https://indestructible.co.uk/product/non-reversible-thermal-indicating-paint-thermal-indicating-paint-with-a-permanent-colour-change.

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A bearing assembly includes a first bearing ring and a second bearing ring that are movable with respect to each other, and at least part of the first bearing ring and/or at least part of the second bearing ring is provided with a first thermochromatic coating that has a first color in a first temperature range and a second color in a second temperature range.

18 Claims, 2 Drawing Sheets

BEARING ASSEMBLY

CROSS-REFERENCE

This application claims priority to German patent application no. 10 2021 213 567.6 filed on Nov. 30, 2021, the contents of which are fully incorporated herein by reference.

TECHNOLOGICAL FIELD

The present disclosure is directed to a bearing assembly configured to indicate whether the bearing assembly has been exposed to temperatures above a predetermined level.

BACKGROUND

Bearing assemblies, in particular for vehicles, can be subjected to high loads. In order to withstand these loads, all parts and components of the bearing assembly should be in perfect condition. However, the perfect condition of the parts and components can be compromised when the bearing assembly is subjected to extreme operating conditions, such as, for example, excessive temperatures. In particular, the permitted maximum temperature may be exceeded for too long a time during bearing operation, whereby a thermal overloading of the bearing assembly can occur.

In a bearing assembly that has been significantly thermally overloaded, the probability is high that it will not achieve its planned service life. It is thus important to recognize early whether a bearing assembly has been thermally overloaded so that suitable countermeasures can be taken, such as, for example, exchanging the bearing assembly earlier than planned, in order to avoid greater damage or unplanned downtime. However, the integrating of temperature sensors that record and control the temperature profile in a bearing assembly during operation is a relatively complex and cost-intensive process.

SUMMARY

It is therefore an aspect of the present disclosure to provide a bearing assembly that can indicate whether the bearing assembly has been thermally overloaded.

In the following a bearing assembly is described that includes at least one first bearing ring and at least one second bearing ring that are movable with respect to each other. For example, the first and the second bearing ring can be part of a bearing unit. The bearing unit can be configured as a plain bearing. Alternatively, rolling elements can be disposed between the first and second bearing rings, and the bearing unit can be configured as a rolling-element bearing. Furthermore, the bearing assembly can be used in a vehicle, such as, for example, a motor vehicle.

In order to recognize in a simple manner whether the bearing assembly has been thermally overloaded, at least one of the bearing rings is at least partially provided with a first thermochromatic coating. The first thermochromatic coating can in particular be sprayed, precipitated, evaporated, and/or applied as paint onto the at least one bearing ring. Furthermore, the first thermochromatic coating can be applied as a planar coating, a strip-shaped coating and/or a punctiform coating. Suitable thermochromatic coatings are available from Indestructible Paint Ltd. of Birmingham, United Kingdom under the trade name Colour-Therm.

The first thermochromatic coating preferably has a first color in a first temperature range and a second color at least in a second temperature range. In a third or further temperature range, the first thermochromatic coating can preferably have a third or further color. For example, the first temperature range of the first thermochromatic coating can fall between 50° C. and 100° C., the second temperature range of the first thermochromatic coating can fall between 100° C. and 150° C., and the third temperature range of the first thermochromatic coating can fall between 150° C. and 200° C.

The first thermochromatic coating is preferably applied at least in one region of the at least one bearing ring that is visible and/or easily accessible in an installed state of the bearing assembly. For example, the first thermochromatic coating can be applied on an outer side of the bearing ring, an end side of the bearing ring, and/or a flange of the bearing ring. Alternatively or additionally, the first thermochromatic coating can be applied in the region of an exchangeable seal of the bearing unit so that when the seal is removed, for example, during a maintenance process of the bearing assembly, the color displayed by the coating can be examined directly. This has the advantage that the color shown by the coating can be assessed without disassembling the entire bearing assembly, but the coating is protected from external influences during operation of the bearing assembly.

According to a further embodiment, at least one second region of the bearing assembly is at least partially provided with at least one second thermochromatic coating different from the first thermochromatic coating. Furthermore, the second thermochromatic coating can be applied as a planar coating, a strip-shaped and/or a punctiform coating.

The second thermochromatic coating preferably has a first color in a first temperature range and a second color at least in a second temperature range, wherein in a third or further temperature range, the second thermochromatic coating preferably has a third or further color. For example, the first temperature ranges, in which the first thermochromatic coating and the second thermochromatic coating have their respective first color, can be identical. The second temperature ranges, in which the first thermochromatic coating and the second thermochromatic coating have their respective second color, can advantageously differ from each other. In particular, the second temperature range of the second thermochromatic coating can fall at lower temperatures than the second temperature range of the first thermochromatic coating. For example, the first temperature range of the second thermochromatic coating can fall between 50° C. and 100° C., and the second temperature range of the second thermochromatic coating can fall between 100° C. and 120° C.

Furthermore, the color in the first temperature range can be identical for the first and the second thermochromatic coating, while the colors of the first and second thermochromatic coatings differ from each other in at least one further temperature range. This means that in a state in which the bearing assembly was not subjected to an impermissible temperature, it is not recognizable on the bearing assembly where the first thermochromatic coating is applied and where the second thermochromatic coating is applied. Due to the different colors in the second temperature range, in particular when the second temperature ranges differ, it can be recognized how highly the bearing assembly has been thermally loaded.

According to a further preferred embodiment, the first and the second thermochromatic coatings are applied in different regions from each other. In particular, the first and the second coating can be applied adjacent to each other, in particular directly adjacent to each other. For example, when the first and the second thermochromatic coatings are applied in the form of points and/or strips, the points and/or strips of the first thermochromatic coating and the points and/or strips of the second thermochromatic coating can be applied alternately with respect to each other. In addition, the first thermochromatic coating and the second thermochromatic coating can be applied on mutually differing regions of the bearing assembly and/or on different bearing components. For example, the second coating can be applied in the interior of the bearing assembly and/or onto the sensitive components of the bearing assembly.

The color change of the first and/or of the second thermochromatic coating is preferably irreversible. That is, as soon as the thermochromatic coating has changed its color due to a temperature being reached, it retains this color even when the bearing assembly has cooled again. It can thereby be ensured that during maintenance it is recognizable whether the bearing assembly has been subjected to an impermissibly high temperature.

Furthermore, the bearing assembly can be a wheel bearing assembly, and the first and the second bearing ring can be part of a rolling-element bearing that includes a plurality of rolling elements in which the first and the second bearing rings define between them an interior in which the plurality of rolling elements are disposed, wherein the first bearing ring is preferably connectable to a wheel, and the second bearing is preferably connectable to an axle element. Preferably the first thermochromatic coating is applied on at least one outer side of a bearing ring, and the second thermochromatic coating is applied at least in the interior. In particular, the second thermochromatic coating can be applied in a region of the interior that has no sliding, frictional and/or rolling contact with another element. For example, the second thermochromatic coating can be applied on an end surface of a rolling element, in particular in a recessed region, such as, for example, in a dimple, or a part of the end surface that has no contact with a retaining and/or guide flange, a cage, and/or an inner surface of the bearing rings.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
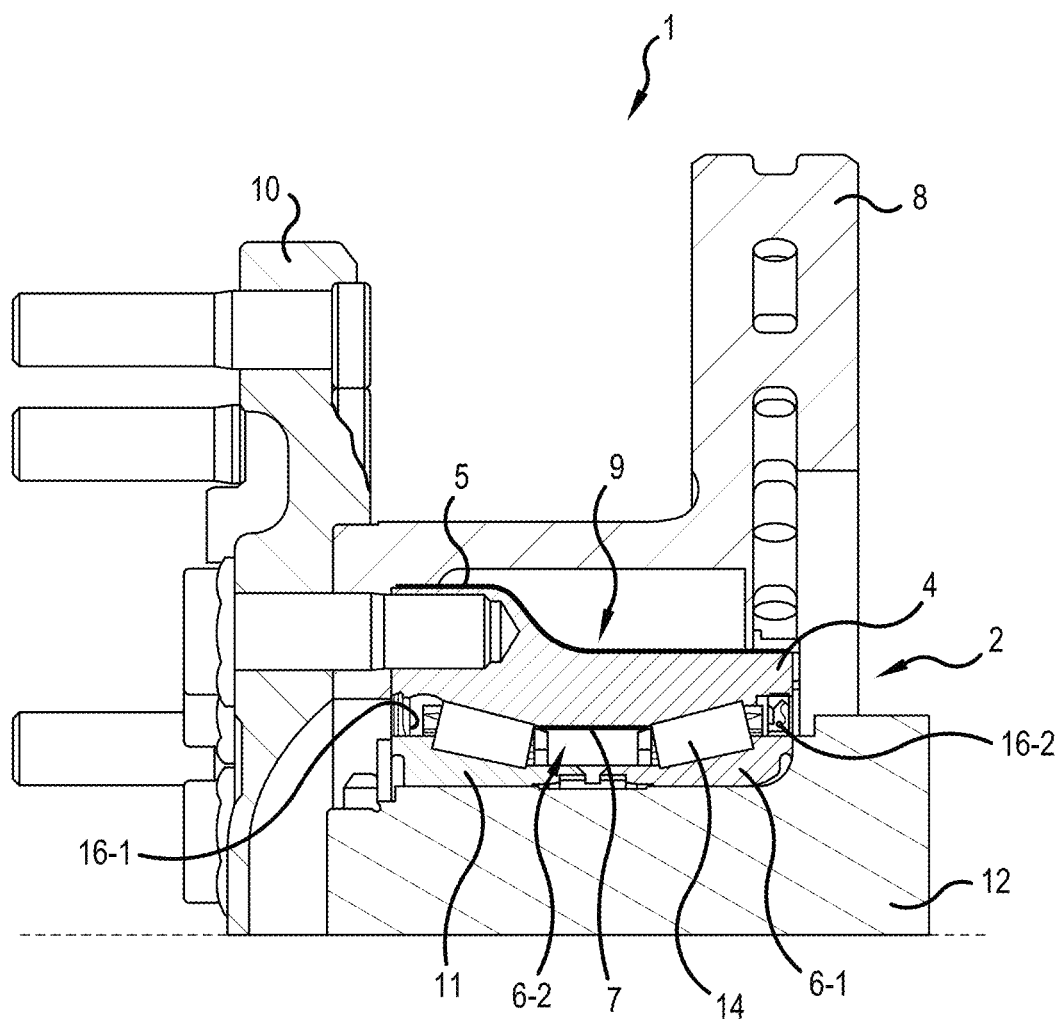
FIG. 1 is an axial sectional view through a bearing assembly according to a first embodiment of the present disclosure.

FIG. 1 shows an axial sectional view through a bearing assembly 1 according to a first embodiment. The bearing assembly 1 is in particular a wheel bearing assembly for motor vehicles. In the exemplary embodiment shown in FIG. 1, the bearing assembly 1 comprises a bearing unit 2 having a first bearing ring 4 and a second bearing ring 6-1, 6-2. In FIG. 1, the second bearing ring 6-1, 6-2 is configured two-part, but can alternatively also be configured one-part. As can be seen in FIG. 1, a brake element 8 and a wheel adapter 10 to which a wheel is attachable, can be attached to the first bearing ring 4, while the second bearing ring 6 is supported on an axle element 12. Of course, the bearing assembly 1 can also be used in other fields in which a relative movability between two components is made possible with the aid of a bearing unit.

A plurality of rolling elements 14 are disposed between the first bearing ring 4 and the second bearing ring 6. Alternatively the bearing unit 2 can also be a plain bearing having no rolling elements 14. In the example of FIG. 1, the bearing unit 2 is configured double row, and the plurality of rolling elements 14 are tapered rollers. Alternatively the bearing unit 2 can also be configured as a single row bearing or have more than two rows. Furthermore, instead of tapered rollers, the rolling elements can also be balls, spherical rollers, barrels, needle rollers, or any other type of rolling elements.

In order to recognize in a simple manner whether the bearing assembly 1 has been thermally overloaded, in FIG. 1 the first bearing ring 4 and a part of the second bearing ring 6-1 are provided at least partially with a first thermochromatic coating 5. The thermochromatic coating can be applied in particular by spraying, precipitation, evaporation, and/or as paint. Furthermore, the first thermochromatic coating can be applied as planar coating, strip-shaped and/or punctiform coating.

Furthermore, the color change of the first thermochromatic coating 5 is irreversible. That is, as soon as the thermochromatic coating 5 has changed its color due to a temperature being reached, it retains this color even when the bearing assembly 1 has cooled again.

The first thermochromatic coating 5 is configured to display a first color in a first temperature range and a second color in a second temperature range. Here the first temperature range of the first thermochromatic coating falls between 50° C. and 100° C., and the second temperature range of the first thermochromatic coating 5 falls between 100° C. and 150° C. Furthermore, the first thermochromatic coating 5 can display a third color in a third temperature range, wherein for example, the third temperature range of the first thermochromatic coating 5 can fall between 150° C. and 200° C.

In FIG. 1, the first thermochromatic coating 5 is applied onto the outer side of the first bearing ring 4, i.e., in regions that are visible and/or easily accessible in an installed state of the bearing assembly 1. Alternatively or additionally, the first thermochromatic coating 5 can also be applied in the region of the end sides of the first bearing ring and/or in the region of an exchangeable seal 16-1, 16-2 of the bearing unit 2 so that with the removal of the seal 16-1, 16-2, for example, during a maintenance process of the bearing assembly 1, the color shown by the coating can be examined directly.

Furthermore, in FIG. 1 an inner side 11 of the first bearing ring 4 is provided with a second thermochromatic coating 7 different from the first thermochromatic coating. The second thermochromatic coating can also be applied as a planar coating, a strip-shaped and/or a punctiform coating. Alternatively or additionally, the second thermochromatic coating 7 can be applied on an end surface of a rolling element, in particular in a recessed region, such as, for example, in a dimple or a part of the rolling-element end surface that has no contact with a retaining and/or guide flange and/or a cage.

Here the second thermochromatic coating 7 has a first color in a first temperature range and a second color in a second temperature range. Furthermore, the second thermochromatic coating 7 can also be configured to have a third color in a third temperature range. Like the first thermochromatic coating 5, the color change of the second thermochromatic coating is also irreversible.

In the bearing assembly shown in FIG. 1, for example, the first temperature ranges, in which the first thermochromatic coating 5 and the second thermochromatic coating 7 display their respective first color are identical. Alternatively the first temperature ranges, in which the first thermochromatic coating 5 and the second thermochromatic coating 7 show their respective first color, can also differ from each other. Furthermore, it is advantageous when the second temperature ranges, in which the first thermochromatic coating 5 and the second thermochromatic coating 7 display their respective second colors, differ from each other. In particular, the second temperature range of the second thermochromatic coating 7 can fall at lower temperatures than the second temperature range of the first thermochromatic coating 5. This makes it possible to record a temperature gradient along the bearing assembly. For example, the first temperature range of the second thermochromatic coating 7 can fall between 50° C. and 100° C., and the second temperature range of the second thermochromatic coating 7 can fall between 100° C. and 120° C.

In the bearing assembly 1 of FIG. 1, the first and the second thermochromatic coatings 5, 7 are chosen such that their colors are identical in the first temperature range but differ from each other in the second temperature range. Thus when the bearing assembly 1 has not been subjected to an impermissible temperature, it cannot be determined where the first thermochromatic coating 5 is applied and where the second thermochromatic coating 7 is applied. Alternatively, in the first temperature range, the colors of the first and of the second thermochromatic coating 5, 7 can also differ.

Figure 2:
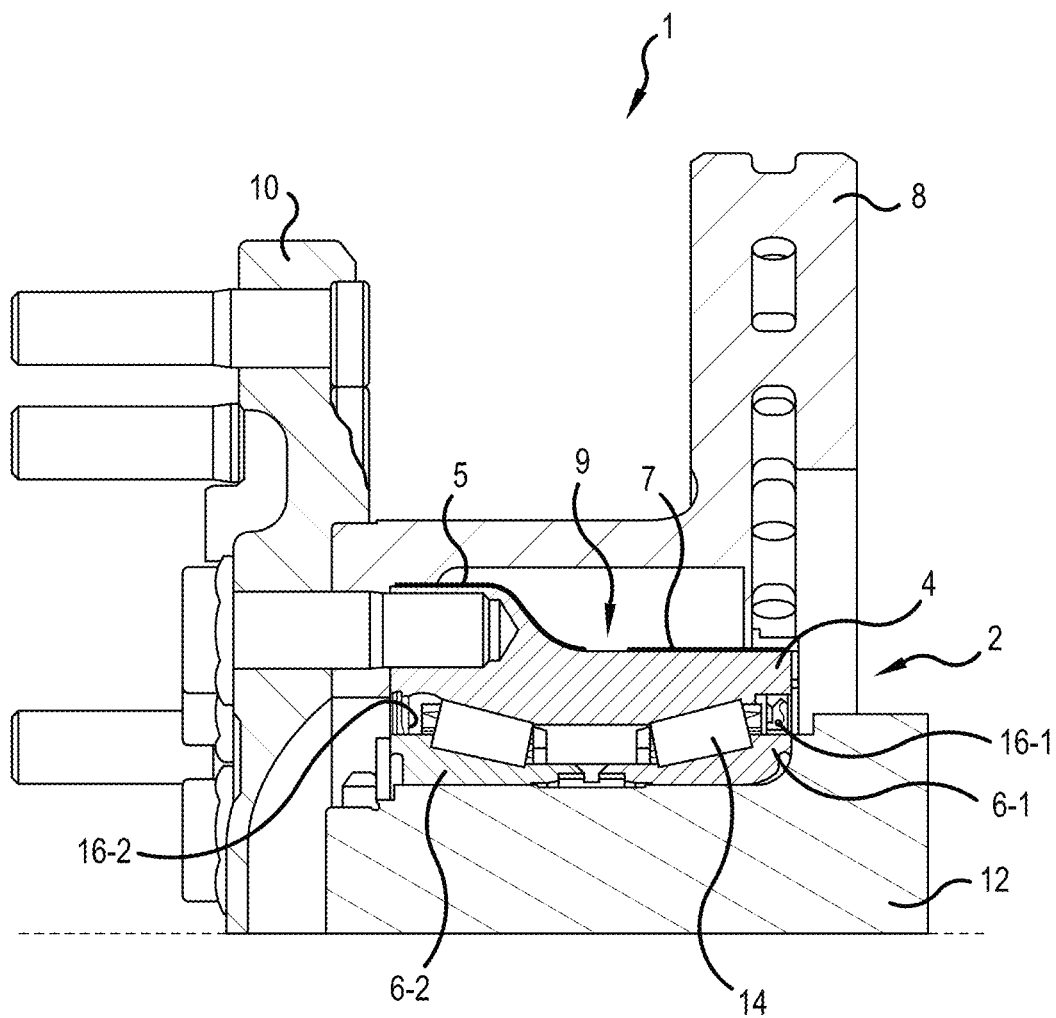
FIG. 2 is an axial sectional view through a bearing assembly according to a second embodiment of the present disclosure.

FIG. 2 shows an axial sectional view through a bearing assembly 1 according to a second embodiment. The bearing assembly 1 of FIG. 2 differs from the bearing assembly 1 of FIG. 1 in that in the bearing assembly 1 of FIG. 2, both the first and the second thermochromatic coatings 5, 7 are on the outer side of the first bearing ring 4. In FIG. 2, the first and the second thermochromatic coatings are separated from each other by a not-coated region. Alternatively or additionally, the first and the second thermochromatic coatings can also be applied directly adjacent to each other. Furthermore, it is also conceivable when the first and the second thermochromatic coatings are applied in the form of points and/or strips, to apply the points and/or strips of the first thermochromatic coating and the points and/or strips of the second thermochromatic coating in an alternating manner.

In summary, the application of a thermochromatic coating 5, 7 onto at least one bearing component 4, 6, 14 of the bearing assembly 1 makes it possible to recognize whether the bearing assembly 1 has been subjected to an impermissibly high temperature by the thermochromatic coating 5, 7 undergoing a color change. It can thereby be recognized whether the bearing assembly 1 should be serviced and/or exchanged so that by a timely changing of the bearing unit unplanned repair times and/or greater damage can be avoided, whereby costs can also be reduced, since no unplanned downtimes arise, and the extent of damage can be understood with higher probability. In particular, when the bearing assembly 1 is used in a motor vehicle, the risk of accident can be reduced, and safety on the road can be increased.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Bearing unit
4 First bearing ring
5 First thermochromatic coating
6-1, 6-2 Second bearing ring
7 Second thermochromatic coating
8 Brake element
9 Outer surface
10 Wheel adapter
11 Interior
12 Axle element
14 Rolling element
16-1, 16-2 Seal

What is claimed is:

1. A bearing assembly comprising:
a first bearing ring,
a second bearing ring, and
at least one row of rolling elements between the first bearing ring and the second bearing ring,
wherein the first bearing ring and the second bearing ring are movable with respect to each other,
wherein at least part of the first bearing ring is provided with a first thermochromatic coating, and
wherein an axial width of the first thermochromatic coating is greater than an axial width of a first row of the at least one row of rolling elements.

2. The bearing assembly according to claim 1, wherein the first thermochromatic coating has a first color in a first temperature range and a second color in a second temperature range.

3. The bearing assembly according to claim 2,
wherein the first thermochromatic coating has a third color in a third temperature range.

4. The bearing assembly according to claim 2,
wherein the first thermochromatic coating is applied to a first region of the bearing assembly,
wherein a second thermochromatic coating is applied to a second region of the bearing assembly, and
wherein the second thermochromatic coating is different from the first thermochromatic coating.

5. The bearing assembly according to claim 4,
wherein the second thermochromatic coating has a third color in a third temperature range and a fourth color in a fourth temperature range.

6. The bearing assembly according to claim 5,
wherein the second thermochromatic coating has a fifth color in a fifth temperature range.

7. The bearing assembly according to claim 4, wherein the first thermochromatic coating and/or the second thermochromatic coating is configured to undergo an irreversible color change.

8. The earing assembly according to claim 4,
wherein in the first temperature range, the first color of the first thermochromatic coating is identical to a color of the second thermochromatic coating, and
wherein in the second temperature range, the second color of the first thermochromatic coating is different from the color of the second thermochromatic coating.

9. The bearing assembly according to claim 8,
wherein the first region does not touch the second region.

10. The bearing assembly according to claim 4,
wherein the first thermochromatic coating is applied on a radially inner surface of the first bearing ring, and
wherein the second thermochromatic coating is applied on a radially outer surface of the first bearing ring.

11. The bearing assembly according to claim 2,
wherein the bearing assembly is a wheel bearing assembly,
wherein the first bearing ring and the second bearing ring define an interior between them in which the at least one row of rolling elements are disposed, and
wherein the first bearing ring is connectable to a wheel, and the second bearing ring is connectable to an axle element.

12. The bearing assembly according to claim 1,
wherein the at least one row of rolling elements includes a second row of rolling elements, and
wherein the first thermochromatic coating is located axially between the first row of rolling elements and the second row of rolling elements.

13. The bearing assembly according to claim 1,
wherein the first thermochromatic coating is located radially between the first bearing ring and the second bearing ring.

14. The bearing assembly according to claim 1,
wherein the first thermochromatic coating extends from a first location on a first axial side of the first row of the at least one row of rolling elements to a second location on a second axial side of the at least one row of rolling elements.

15. A bearing assembly comprising:
a first bearing ring, and
a second bearing ring,
wherein the first bearing ring and the second bearing ring are movable with respect to each other,
wherein at least part of the first bearing ring and/or at least part of the second bearing ring is provided with a first thermochromatic coating,
wherein the at least part of the first bearing ring is provided with the first thermochromatic coating, and
wherein a seal is mounted in contact with the first thermochromatic coating.

16. The bearing assembly according to claim 15,
wherein the first bearing ring is located radially outward of the second bearing ring.

17. The bearing assembly according to claim 15,
wherein the first bearing ring is located radially inward of the second bearing ring.

18. A bearing assembly comprising:
a first bearing ring having a first axial end and a second axial end,
a second bearing ring having a first axial end and a second axial end, and
a first seal mounted radially between the first bearing ring and the second bearing ring at the first axial ends of the first and second bearing rings,
wherein the first bearing ring and the second bearing ring are movable with respect to each other, and
wherein a surface at the first axial end of the first bearing ring in contact with the first seal includes a thermochromatic coating radially between the first seal and the first bearing ring.

* * * * *